United States Patent [19]
Gautheron et al.

[11] Patent Number: 6,130,765
[45] Date of Patent: Oct. 10, 2000

[54] DROP/INSERT APPARATUS FOR DROPPING/INSERTING CHANNELS ON A BIDIRECTIONAL MULTI-CHANNEL OPTICAL LINK

[75] Inventors: Olivier Gautheron, Montigny le Bretonneux; Vincent Letellier, Paris, both of France

[73] Assignee: Alcatel, Paris, France

[21] Appl. No.: 08/939,167

[22] Filed: Sep. 29, 1997

[30] Foreign Application Priority Data

Oct. 3, 1996 [FR] France .................................. 96 12057

[51] Int. Cl.[7] ...................................................... H04J 14/02
[52] U.S. Cl. .......................... 359/127; 359/124; 359/130; 385/24
[58] Field of Search ..................................... 359/124, 127, 359/130; 385/24, 37

[56] References Cited

U.S. PATENT DOCUMENTS

| | | | |
|---|---|---|---|
| 5,633,741 | 5/1997 | Giles | 359/124 |
| 5,742,416 | 4/1998 | Mizrahi | 359/130 |

FOREIGN PATENT DOCUMENTS

2687030A1  8/1993  France .

OTHER PUBLICATIONS

Chawki et al, "Evaluation of an Optical Boosted Add/Drop Multiplexer OBADM Including Circulators and Fiber Grating Filters", 21st European Conference on Optical Communications ECOC 95, vol. 1, 17–21 Sep. 1995, pp. 47–50 XP002032556.

K. P. Jones et al, "Optical Wavelength Add–Drop Multiplexer in Installed Submarine WDM Network" Electronics Letters, vol. 31, No. 24, Nov. 23, 1995, p. 2117/2118 XP000548194.

*Primary Examiner*—Kinfe-Michael Negash
*Attorney, Agent, or Firm*—Sughrue, Mion, Zinn, Macpeak & Seas, PLLC

[57] ABSTRACT

A drop/insert apparatus for dropping/inserting channels on a both-way multi-channel optical link includes a "line" optical fiber serving to convey optical signals in two opposite transmission directions, over at least two channels having distinct wavelengths per transmission direction. The apparatus comprises: two main circulators inserted in said line fiber [two of the ports of each of them are connected to said line fiber, and their third ports are connected respectively to a first auxiliary optical fiber and to a second auxiliary optical fiber], each main circulator causing the optical signals to rotate in a rotation direction such that the signals propagating along said line fiber in one of the transmission directions remain in the line fiber; and, two auxiliary circulators inserted respectively in said first auxiliary fiber and in said second auxiliary fiber, each of said auxiliary circulators causing the optical signals to rotate in a direction opposite to that of the main circulator to which it is connected directly by one of said auxiliary fibers. At least one diffraction grating, having a reflection wavelength corresponding to the wavelength of a channel to be dropped in the go direction, is inserted in the line fiber between the main circulators, and at least one diffraction grating, having a reflection wavelength corresponding to the wavelength of a channel to be dropped in the return direction, is inserted in the by-pass fiber between the auxiliary circulators.

5 Claims, 1 Drawing Sheet

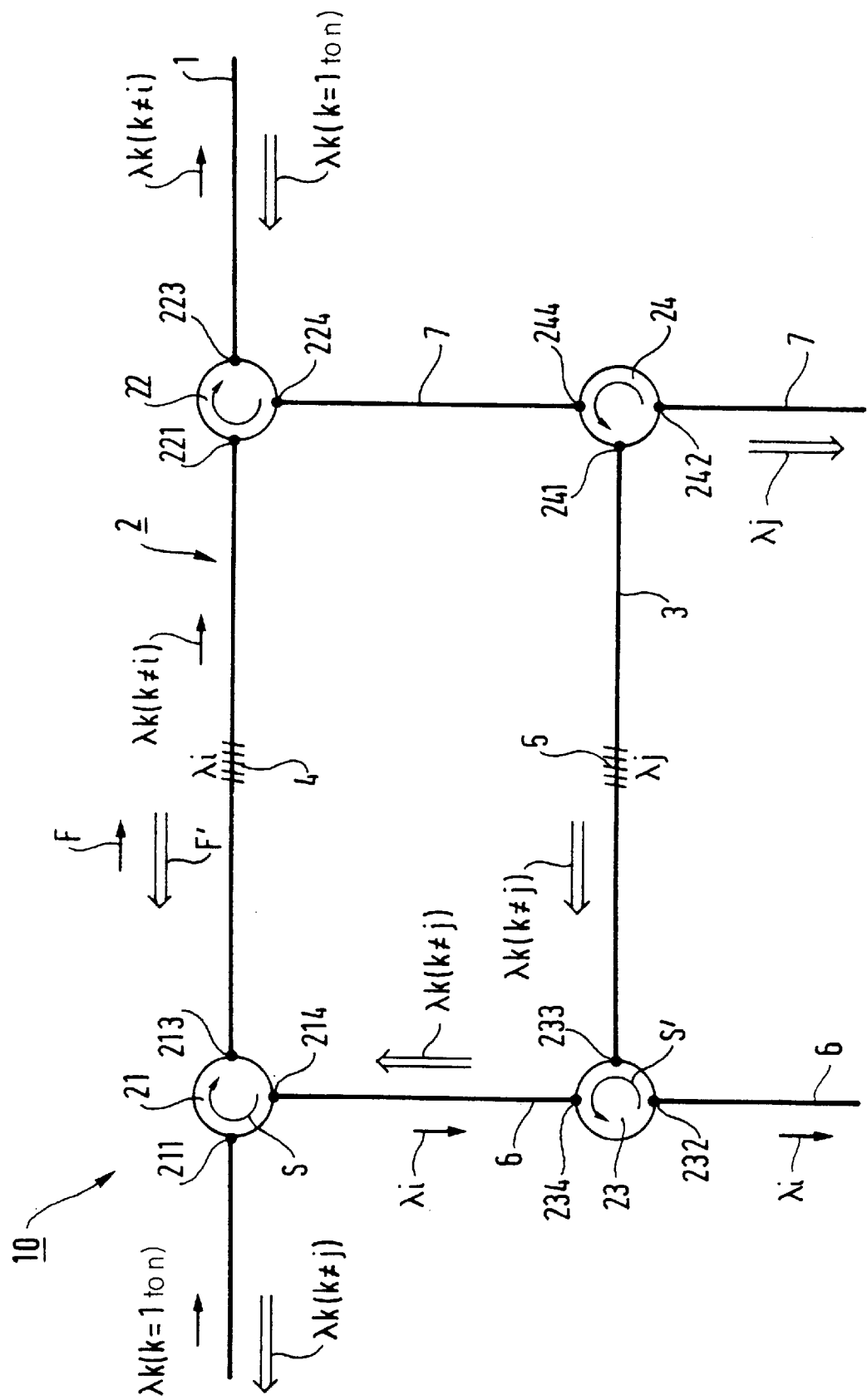

DROP/INSERT APPARATUS FOR DROPPING/INSERTING CHANNELS ON A BIDIRECTIONAL MULTI-CHANNEL OPTICAL LINK

The present invention relates to a drop/insert apparatus for dropping/inserting channels to a both-way multi-channel optical link, and in particular on an optical link of the Wavelength Division Multiplex (WDM) type.

BACKGROUND OF THE INVENTION

A multi-channel optical link is an optical link designed to convey optical signals over a plurality of channels, each channel having a transmission wavelength that is distinct from those of the other channels. When the optical link is both-way, it conveys a plurality of channels in both transmission directions, commonly referred to as the "go" direction and the "return" direction.

Currently envisaged multi-channel optical links are constituted by lines that are optically continuous over very long distances (several tens of thousands of kilometers). In that type of link, a traffic optical signal is never conveyed from one end of the link to the other. In general, optical channels are dropped and/or inserted at regular intervals along the link for the purposes of serving particular geographic zones. Such dropping and inserting is performed by means of drop/insert apparatus comprising optical circulators and diffraction gratings such as Bragg gratings.

Conventional channel-dropping apparatus as used to drop a channel from a one-way optical link comprises a three-port optical circulator inserted directly in the line optical fiber so that two of its ports are connected thereto. Its third port is connected to an "auxiliary" optical fiber portion. Finally, a diffraction grating is inserted in the line optical fiber, e.g. downstream from the circulator if said circulator operates clockwise.

That apparatus operates as follows for an optical link which is capable of conveying n channels (where n is an integer not less than 2) and from which a channel of wavelength $\lambda i$ (where i lies in the range 1 to n) is to be dropped to serve a given geographic zone (assuming that all of the channels are present on the link on arriving at the dropping apparatus).

Signals of wavelength $\lambda j$ (where j lies in the range 1 to n) arrive at the circulator via its first port, and they are then directed to its second port which directs them to the diffraction grating. The diffraction grating has a reflection wavelength equal to $\lambda i$. Signals of wavelength $\lambda i$ are thus reflected by the diffraction grating towards the second port of the circulator which port then directs them towards the auxiliary optical fiber, the other end of which is connected, for example, to an optical signal receiver. Signals of wavelength $\lambda i$ (and therefore the channel $\lambda i$) are thus dropped from the link.

Such apparatus could be used to insert a channel of wavelength $\lambda k$ into the link in the return direction via the auxiliary fiber by means of the circulator which would direct it directly in the return direction. Thus, such apparatus could serve to drop a channel in the go direction and to insert a channel in the return direction.

It would thus be reasonable to think that by using such apparatus associated with symmetrical apparatus (a circulator operating counterclockwise associated with a diffraction grating inserted in the line fiber upstream from the circulator) would enable channels to be dropped and inserted in both directions of the both-way link.

Unfortunately, that is not the case. If two symmetrical apparatuses of that type are associated, it is not possible for a channel whose wavelength is identical to that of a channel that has been dropped in the go direction to be conveyed over the link in the return direction, because of the diffraction grating inserted in the line fiber to perform dropping in the go direction. Similarly, it is not possible for a channel whose wavelength is identical to that of a channel that has been dropped in the return direction to be conveyed over the link in the go direction, because of the diffraction grating inserted in the line fiber to perform dropping in the return direction.

It can thus be well understood that, although such a solution appears simple initially, it is very inflexible.

OBJECTS AND SUMMARY OF THE INVENTION

An object of the present invention is thus to develop drop/insert apparatus for dropping/inserting channels on a both-way multi-channel optical link, which apparatus does not suffer from the above-mentioned drawbacks.

To this end, the present invention provides drop/insert apparatus for dropping/inserting channels on a both-way multi-channel optical link, said link including a "line" optical fiber serving to convey optical signals in two opposite transmission directions, namely a "go" direction and an opposite "return" direction, over at least two channels having distinct wavelengths per transmission direction, said apparatus comprising four optical circulators each having at least three ports, two of said circulators referred to as "main" circulators being inserted in said line fiber so that two of the ports of each of them are connected to said line fiber, the third ports of said main circulators being connected respectively to a first auxiliary optical fiber and to a second auxiliary optical fiber, each of said main circulators causing the optical signals to rotate in a rotation direction such that the optical signals propagating along said line fiber in one of said transmission directions remain in said line optical fiber;

the two other circulators referred to as "auxiliary" circulators being inserted respectively in said first auxiliary optical fiber and in said second auxiliary optical fiber so that two of the ports of each of them are connected to a respective one of said auxiliary optical fibers, the third ports of said auxiliary circulators being connected together via a "bypass" optical fiber, each of said auxiliary circulators causing the optical signals to rotate in a direction opposite to that of the main circulator to which it is connected directly by one of said auxiliary optical fibers;

said apparatus further including at least one diffraction grating inserted in said line fiber between said main circulators and having a reflection wavelength corresponding to the wavelength of a channel to be dropped from said line fiber in the go direction, and at least one diffraction grating inserted in said by-pass fiber between said auxiliary circulators, and having a reflection wavelength corresponding to the wavelength of a channel to be dropped from said line fiber in the return direction.

According to the invention, a by-pass is created in parallel with the optical link at the drop/insert apparatus. By means of the by-pass, it is possible to associate drop and insert units operating in one transmission direction without penalizing transmission in the opposite direction, since the diffraction grating(s) serving to drop channels in the go direction is/are inserted in the line fiber, while the diffraction grating(s) serving to drop channels in the return direction is/are inserted in the by-pass fiber.

BRIEF DESCRIPTION OF THE DRAWING

Other characteristics and advantages of the present invention appear from the following description of an embodiment of the present invention, given by way of non-limiting example.

The sole FIGURE is a simplified diagram of drop/insert apparatus of the invention.

MORE DETAILED DESCRIPTION

The following convention is used below to designate the ports of the circulator: the ports of a circulator are each numbered by reference numbers ending in 1, 2, 3, and 4 in the direction in which the circulator operates, the reference number ending in 1 designating the port situated in the "West" position each of circulator.

The figure shows a both-way optical link 10 having n channels (where n is an integer not less than 2), which link includes a line optical fiber 1 having its ends connected to respective optical signal transmitter/receivers (not shown). The link 10 also includes drop/insert apparatus of the invention, referenced 2, and inserted in the line fiber 1.

The channels conveyed in the go direction (arrow F) are represented by a single arrow, and the channels conveyed in the return direction (arrow F') are represented by a double arrow.

The drop/insert apparatus 2 of the invention comprises:

two three-port "main" circulators 21 and 22 both of which operate in the same direction S, in the embodiment shown, e.g. clockwise, the main circulators being inserted in the line fiber 1 so that circulator 21 has two of its ports 211 and 213 connected to said line fiber, and circulator 22 has two of its ports 221 and 223 connected thereto, said main circulators 21 and 22 succeeding each other in the go direction;

a "by-pass" optical fiber 3;

two "auxiliary" circulators 23 and 24, each of which has at least three ports, and both of which operate in the same direction S' opposite to direction S, in the embodiment shown, i.e. counterclockwise, the auxiliary circulators being connected together via the by-pass fiber 3 which interconnects their respective ports 223 and 241;

a diffraction grating 4 inserted in the line fiber 1 between the main circulators 21 and 22, and having a reflection wavelength $\lambda i$ (where i is an integer lying in the range 1 to n);

a diffraction grating 5 inserted in the by-pass fiber 3 between the auxiliary circulators 23 and 24 and having a reflection wavelength $\lambda j$ (where j is an integer lying in the range 1 to n and which may be equal to i); and two "auxiliary" optical fibers 6 and 7 respectively connecting port 214 of main circulator 21 (immediately after port 213 in direction S) to port 234 of auxiliary circulator 23 (immediately after port 233 in direction S'), and connecting port 224 of main circulator 22 (immediately after port 223 in direction S) to port 244 of auxiliary circulator 24 (immediately before port 241 in direction S').

The apparatus 2 operates as follows. It is assumed that all of the channels that can be conveyed by the link 10 in the go direction arrive at port 211 of main circulator 21, and that all of the channels that can be conveyed by the link 10 in the return direction arrive at port 223 of main circulator 22.

Thus, in the go direction, signals of wavelength $\lambda k$ (where k lies in the range 1 to n) are directed by circulator 21 to diffraction grating 4. As a result, signals of wavelength $\lambda i$ are reflected by diffraction grating 4 and return to circulator 21 (port 213) which directs them via its port 214 and via auxiliary fiber 6 towards auxiliary circulator 23 which, in turn, sends them via its port 232, e.g. towards a receiver (not shown) for serving a given geographic zone. The other signals of wavelength $\lambda k$ ($k \neq i$) pass through diffraction grating 4, and they then arrive at port 221 of circulator 22 which then directs them towards port 223 and thus towards the line fiber 1 over which they continue to be conveyed. In this way, the channel of wavelength $\lambda i$ is dropped in the go direction.

In the same way, in the return direction, signals of wavelength $\lambda k$ (where k lies in the range 1 to n) are directed by circulator 22 to circulator 24 which itself directs them to diffraction grating 5. As a result, signals of wavelength $\lambda j$ are reflected by diffraction grating 5 and they return to circulator 24 (port 241) which directs them via its port 242 and via auxiliary fiber 7, e.g. towards a receiver (not shown) for serving a given geographic zone. The other signals of wavelength $\lambda k$ ($k \neq j$) pass through diffraction grating 5 and they then arrive at port 233 of circulator 23 which then directs them via its port 234 and via auxiliary fiber 6 towards circulator 21 which itself directs them towards the line fiber 1 over which they continue to be conveyed. In this way, the channel of wavelength $\lambda j$ is dropped from the optical link 10 in the return direction.

In identical manner, it is possible to insert the channel of wavelength $\lambda i$ in the go direction via auxiliary fiber 7, and to insert the channel of wavelength $\lambda j$ in the return direction via auxiliary fiber 6.

By disposing an additional diffraction grating of reflection wavelength $\lambda l$ ($l \neq i$) between circulators 21 and 22, it is possible to insert the channel of wavelength $\lambda l$ in the go direction via auxiliary optical fiber 7. Likewise, by disposing an additional diffraction grating of reflection wavelength $\lambda m$ ($m \neq j$) between circulators 23 and 24, it is possible to insert the channel of wavelength $\lambda m$ in the return direction via auxiliary optical fiber 6.

By causing the number of diffraction gratings used and their reflection wavelengths to vary, it is possible to drop or to insert as many channels as desired, in either transmission direction. Naturally, in a given direction, it is only possible to insert into the line a channel that has been dropped previously in that direction (within the same drop/insert apparatus, or within preceding drop/insert apparatus), and similarly, it is only necessary to drop from the line a channel that already exists therein.

It can be well understood that, by means of the apparatus of the invention, it is possible to insert or to drop in one direction channels that have been respectively dropped or inserted in the other, which makes the apparatus very flexible.

Naturally, the present invention is not limited to the above-described embodiment.

In particular, the circulators and the diffraction gratings may be replaced with any other equivalent means enabling the same functions to be performed.

In addition, it is not necessary for both of the main circulators to have the same operating direction (signal rotation direction), nor is it necessary for both of the auxiliary circulators to have the same operating direction. It is necessary merely for each of the main circulators to have an operating direction such that, in one of the transmission directions, the signals propagating over the line optical fiber remain therein. It is also necessary merely for each of the auxiliary circulators to have an operating direction that is opposite to that of the main circulator to which it is connected by the associated auxiliary optical fiber.

What is claimed is:

1. An add/drop device (10) for a multi-wavelength bi-directional optical link, comprising:

two main optical circulators (21, 22) each having at least three ports, a first port (211, 223) of said two main circulators correspondingly forming a first connecting port and a second connecting port for said multi-wavelength, bi-directional optical link, a multi-wavelength optical fiber trunk segment (2) connected between second ports (213, 221) of said main circulators, a first additional optical fiber (6) connected to a third port (214) of one of said main circulators, and a second additional optical fiber (7) connected to a third port (224) of the other main circulator, said ports of said main circulators being arranged so as to establish a mono-directional optical path from the first connecting port to the second connecting port via said optical fiber trunk segment, said add/drop device further comprising:

two additional optical circulators (23, 24) each having at least three ports;

a diversion optical fiber segment (3) connected between said two additional optical circulators;

at least one diffraction pattern (4) arranged on said multi-wavelength optical fiber trunk segment for reflecting a first wavelength ($\lambda_i$), which is to be dropped, received on the first connecting port; and at least one diffraction pattern (5) arranged on said diversion optical fiber segment (3) for reflecting a second wavelength ($\lambda_j$), which is to be dropped, received on the second connecting port;

wherein each additional optical circulator is connected via its first port (234, 244) to one of said additional optical fibers (6, 7) and via its second port to said diversion optical fiber segment so as to establish a mono-directional optical path from said second connecting port to said first connecting port via said diversion optical fiber segment (3).

2. An apparatus according to claim 1, wherein diffraction gratings corresponding to channels to be dropped and/or inserted in an outgoing direction are inserted in the optical fiber trunk segment.

3. An apparatus according to claim 1, wherein diffraction gratings corresponding to channels to be dropped and/or inserted in a return direction are inserted in the diversion optical fiber.

4. An add/drop device (10) for a multi-wavelength bi-directional optical link, comprising:

two main optical circulators (21, 22) each having at least three ports, a first port (211, 223) of said main circulators correspondingly forming a first connecting port and a second connecting port for connecting said optical link to a line optical fiber;

a multi-wavelength optical fiber trunk segment (2) connecting a second port (213, 221) of said main circulators, said ports of said main circulators being arranged so as to establish a mono-directional optical path between the first connecting port and the second connecting port via said optical fiber trunk segment;

a first additional optical fiber (6) connected to a third port (214) of one of said main circulators;

a second additional optical fiber (7) connected to a third port (224) of the other main circulator;

two additional optical circulators (23, 24) each having at least three ports;

a diversion optical fiber segment (3) connected between said two additional optical circulators;

at least one diffraction pattern (4) arranged on said multi-wavelength optical fiber trunk segment for reflecting a first wavelength ($\lambda_i$), which is to be dropped when received on the first connecting port, and which is to be inserted when received on said first additional optical fiber (6); and at least one diffraction pattern (5) arranged on said diversion optical fiber segment (3) for reflecting a second wavelength ($\lambda_j$), which is to be dropped when received on the second connecting port, and which is to be inserted when received on said second additional optical fiber (7);

wherein each additional optical circulator is connected via its first port (234, 244) to one of said additional optical fibers (6, 7) and via its second port to said diversion optical fiber segment so as to establish a mono-directional optical path from said second connecting port to said first connecting port via said diversion optical fiber segment (3).

5. An add/drop device as claimed in claim 4, wherein said two additional optical circulators each has an operating direction opposite to that of the main circulator to which it is connected via one of said auxiliary optical fibers.

* * * * *